(12) United States Patent
Amano et al.

(10) Patent No.: US 6,659,288 B2
(45) Date of Patent: Dec. 9, 2003

(54) PLASMA- OR SERUM-COLLECTING DEVICE

(75) Inventors: Yoshikazu Amano, Saitama (JP); Toshihiro Mori, Saitama (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 76 days.

(21) Appl. No.: 09/858,391

(22) Filed: May 16, 2001

(65) Prior Publication Data
US 2001/0045387 A1 Nov. 29, 2001

(30) Foreign Application Priority Data
May 16, 2000 (JP) .......................... 2000-142730
May 16, 2000 (JP) .......................... 2000-142732

(51) Int. Cl.[7] .......................... B01D 35/00; B01D 39/00
(52) U.S. Cl. .................... 210/406; 210/488; 210/489; 210/505; 422/101; 422/102
(58) Field of Search ................. 210/406, 435, 210/483, 488, 489, 503, 505, 500.41; 422/101, 102

(56) References Cited

U.S. PATENT DOCUMENTS

| | | | |
|---|---|---|---|
| 4,424,279 A | * 1/1984 | Bohn et al. ................ | 422/61 |
| 4,810,394 A | 3/1989 | Masuda ..................... | 210/767 |
| 5,364,533 A | 11/1994 | Ogura et al. ............... | 210/645 |
| 5,393,493 A | 2/1995 | Makino et al. .............. | 422/56 |
| 5,979,669 A | * 11/1999 | Kitajima et al. ........... | 210/455 |
| 5,996,811 A | * 12/1999 | Kitajima et al. ........... | 210/488 |
| 6,220,453 B1 | * 4/2001 | Kitajima et al. ........... | 210/406 |

FOREIGN PATENT DOCUMENTS

| | | |
|---|---|---|
| EP | 226 465 | 6/1987 |
| JP | 44-14673 | 6/1969 |
| JP | 02105043 | 4/1990 |
| JP | 02208565 | 8/1990 |
| JP | 04208856 | 7/1992 |
| JP | 05093721 | 4/1993 |

* cited by examiner

*Primary Examiner*—John Kim
(74) *Attorney, Agent, or Firm*—Reed Smith LLP

(57) ABSTRACT

A plasma- or serum-collecting device with simple structure and easy to handle is provided. The device comprises a vacuum blood-drawing tube accommodating a blood-filtering unit, wherein the vacuum tube contains a space above the blood-filtering unit to preserve blood to be filtered and a partition wall under the blood-filtering unit to keep a backspace at reduced pressure, and the blood-filtering unit contains a communicating needle to break the partition wall at the bottom.

2 Claims, 3 Drawing Sheets

PLASMA- OR SERUM-COLLECTING DEVICE

CROSS-REFERENCES TO RELATED APPLICATIONS

This application claims Paris Convention priority of Japanese Application Nos. 2000-142730 filed May 16, 2000 and 2000-142732 filed May 16, 2000, the complete disclosure of which are hereby incorporated by reference.

FIELD OF THE INVENTION

This invention relates to a device for collecting plasma or serum from blood vessel directly by drawing and filtering blood continuously.

BACKGROUND OF THE INVENTION

Kind or concentration of blood components, such as metabolites, proteins, lipids, electrolytes, enzymes, antigens, and antibodies, is measured, in general, using a plasma or serum sample obtained by centrifuging whole blood. However, centrifuging takes labor and time. Particularly, centrifuging is unsuitable for an urgent case of measuring a small number of samples promptly and on site inspection, because of requiring a centrifuge and electricity. Thereupon, it has been investigated to separate plasma or serum from whole blood by filtration.

Several filtration methods using glass fiber filter have been known wherein whole blood is charged into glass fiber filter contained in a column from one side of the column and pressurized or sucked to obtain plasma or serum from the other side (Japanese Patent KOKOKU Nos. 44-14673, 5-52463, Japanese Patent KOKAI Nos. 2-208565, 4-208856).

However, practical filtration methods capable of obtaining an amount of plasma or serum from whole blood necessary for measuring by an automatic analyzer have not been developed except a part of items, such as blood sugar.

On the other hand, inventors belonging to the assignee of this application have developed a plasma or serum filtering unit comprising a filter element containing a combination of glass fiber filter and porous membrane and a baffle narrowing aperture of the filter element at an exit of a filtrate passage, with which plasma or serum can be separated effectively even from a small quantity of whole blood (U.S. Pat. No. 5,979,669).

Further, these inventors have developed a blood-filtering unit comprising a injection needle for drawing blood at an inlet of the blood-filtering unit and a filtrate receiver connected to an exit of a filtrate passage (U.S. Pat. No. 5,996,811).

But the unit was unsatisfactory for practical use in terms of uneasy operation or handling, since it required a sucking adaptor or syringe connected with the blood-filtering unit to collect and filter blood instantaneously.

Further, a device comprising a vacuum blood-drawing tube containing a injection needle at a front edge of it and accommodating a blood-filtering unit in it, a vacuum tube to suck in filtered serum or plasma, and a part with two injection needles connecting the vacuum blood-drawing tube and the vacuum tube has been developed to separate serum or plasma from whole blood (Japanese Patent KOKAI Nos. 4-208856, 5-93721, 5-188053).

But operation of this device is troublesome too. Because three injection needles contained in the device must be stung in correct order to connect four parts of the device.

SUMMARY OF THE INVENTION

An object of the invention is to provide a device with a simple structure capable of filtering blood to obtain plasma or serum for analysis.

The present inventors found out that the aforementioned problems are solved by one of plasma- or serum-collecting devices described bellow.

In a first embodiment, the shape of the device is adapted to a test tube. In this case, the well-balanced plasma- or serum-collecting device as a whole is obtained by utilizing an external suction equipment to draw and filter blood.

In a second embodiment, a blood-filtering unit is accommodated in a vacuum blood-drawing tube that comprises a partition wall between the blood-filtering unit and the bottom of the vacuum blood-drawing tube to build a vacuum room. In this case, a necessary volume of plasma or serum can be readily obtained by breaking the partition wall after blood to be filtered is drawn into the vacuum blood-drawing tube, since the blood is filtered with the blood-filtering unit by vacuum of the vacuum room.

DETAILED DESCRIPTION OF THE INVENTION

Figures 1, 2:
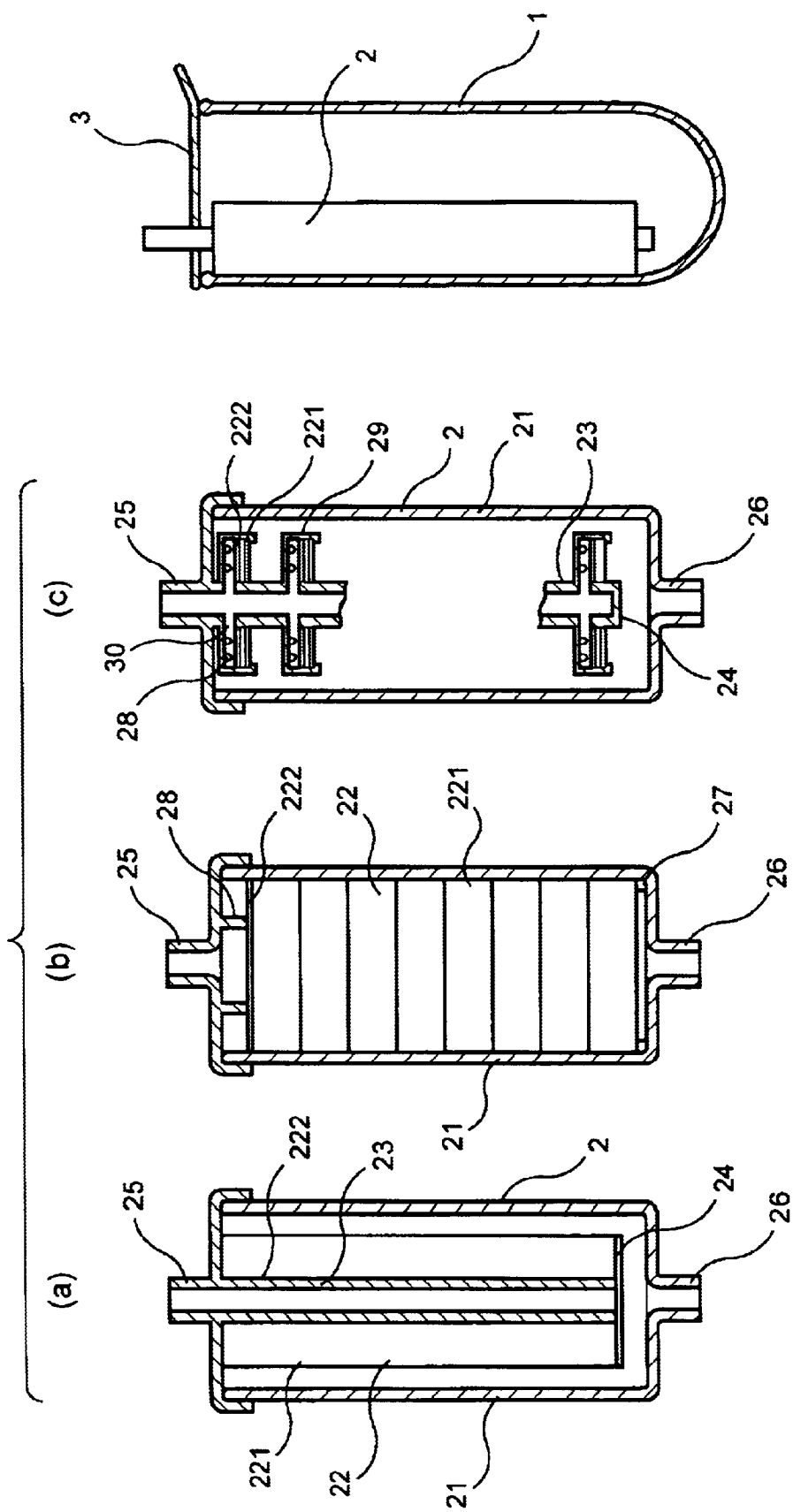
FIG. 1 shows the vertical section of various blood-filtering unit usable in this invention.
FIG. 2 exemplifies the vertical section of an plasma- or serum-collecting device in accordance with the present invention.

At first, the basic construction of the blood-filtering unit usable in the present invention will be described.

The blood-filtering unit comprises blood-filtering material and a holder provided with a blood inlet and a filtrate outlet, which accommodates the blood-filtering material.

There is no restriction of the blood-filtering material used in the invention, but it is preferable to use such material which catches to remove blood cells gradually by entangling at first large blood cell components and then smaller blood cell components in the space structure with permeating in the thickness direction in total of the filtering material, called the volumetric filtration, instead of material which trap blood cells only by the surface. Preferably glass fiber filter is used, and combination of glass fiber filter and a microporous membrane is the most preferably used.

The glass fiber filter has a density of about 0.02 to 0.5 g/cm$^3$, preferably about 0.03 to 0.2 g/cm$^3$, more preferably about 0.05 to 0.13 g/cm$^3$, and a retainable particle size of about 0.6 to 9 $\mu$m, preferably 1 to 5 $\mu$m. By treating the surface of glass fiber with hydrophilic polymer as disclosed in Japanese Patent KOKAI Nos. 2-208565, 4-208856, filtration proceeds faster and smoothly. Lectin or other reactive reagent or modifier may be incorporated into the glass fiber, or the glass fiber may be treated therewith. Two or more sheets of the glass fiber filter may be stacked.

Microporous membranes with surface being made hydrophilic and is capable of separating blood cell from whole blood separate whole blood into blood cells and plasma specifically without hemolysis to the degree of substantially influencing analytical values. A suitable pore size of the microporous membrane is smaller than the retainable particle size of glass fiber filter but is 0.2 $\mu$m or more, preferably about 0.3 to 5 $\mu$m, more preferably about 0.5 to 3 $\mu$m. A higher void content of the microporous membrane is preferable, and a suitable void content is about 40 to 95%, preferably about 50 to 95%, more preferably about 70 to 95%. Illustrative of the microporous membranes are polysulfone membrane, fluorine-containing polymer membrane, cellulose acetate membranes, nitrocellulose membrane, etc. The preferable microporous membranes are polysulfone membrane or cellulose acetate membranes. And polysulfone membrane is the most preferable. The blood-filtering material used in the present invention comprises a build-up of the glass fiber filter opposed to the blood inlet and the microporous membrane opposed to the filtrate outlet. The most preferable build-up is composed of the glass fiber filter and polysulfone membrane. The build-up may be integrated by joining each layer using partially disposed (e.g. spots) adhesive, according to disclosures in Japanese Patent KOKAI Nos. 62-138756-8, 2-105043, 3-16651, etc.

Suitable thickness of the glass fiber filter is about 1 to 10 mm, preferably about 2 to 8 mm. The above mentioned thickness can be achieved by superposing 2 to 10 sheets, preferably 3 to 8 sheets, of the glass fiber filter. Further, the glass fiber filter may be utilized in a cylinder or a roll.

Suitable thickness of the microporous membrane is about 0.05 to 0.5 mm, preferably about 0.1 to 0.3 mm. Though necessary microporous membrane is usually one sheet, two or more sheets may be used in laminate.

The holder accommodates the blood-filtering material, and is provided with the blood inlet and the filtrate outlet. The holder is, in general, formed of a filter chamber accommodating the blood-filtering material and a cap. Both of the filter chamber and the cap have at least one aperture, respectively. One is used as the blood inlet, and the other is used as the filtrate outlet or, further in some cases, as a suction port. The suction port may be provided apart from the filtrate outlet. If the holder is of rectangular prism having the cap on one side of it, both of the blood inlet and the filtrate outlet may be formed on the filter chamber.

The volume of the filter chamber is necessary to be greater than the total volume of the blood-filtering material both in a dry state and in a swelled state upon sucking a sample (i.e. whole blood). When the volume of the filter chamber is smaller than the total volume of the blood-filtering material, filtration does not proceed efficiently and hemolysis occurs. A suitable ratio of the volume of the filter chamber to the total volume of the blood-filtering material in a dry state is, in general, about 101 to 400%, preferably about 110 to 150%, more preferably about 120 to 140%, although the ratio varies according to the swelling degree of the filtering material. A practical volume of it is determined considering the desired volume of filtered plasma or serum, and is about 0.5 to 2.5 ml, typically about 0.6 to 2.2 ml.

Besides, it is necessary that the periphery of the blood-filtering material is closely fitted to the wall of the filter chamber so as not to form a bypass of whole blood without passing the blood-filtering material. But no trouble occurs if whole blood passing through the bypass is in so small volume that it is cut off by the microporous membrane.

As a means for prevent the generation of the bypass, usage of the sealant described in Japanese Patent KOKOKU No. 9-19691 is cited as an example.

The blood-filtering unit used in the present invention is made into a closed structure after attaching the cap to the chamber except the blood inlet and the filtrate outlet, which is also used as a suction port.

The holder is preferably made of plastics. Such transparent or opaque resins as polymethacrylates, polyethylene, polypropylene, polyesters, nylon or polycarbonates may be used.

The cap may be fitted to the filter chamber with various means, such as adhesion using adhesive or fusion welding. On that occasion, either periphery of the holder body or of the cap is located on the inside, or both peripheries are butted. It may be detachably composed utilizing screws or the like.

Next, we describe about the plasma- or serum-collecting device according to the present invention utilizing the above-mentioned blood-filtering unit.

In the first embodiment of the plasma- or serum-collecting device, the shape of the blood-filtering unit is longer than is wide adjusted to the shape of a test tube. Ratio of length: breadth is about 1:1 to 20:1, preferably 3:1 to 6:1.

The shape of the cross section of the blood-filtering unit is not restricted, but is preferably of circle. An example of the blood-filtering unit that is longer than is wide may be provided using a stack of glass fiber filter having low density. In this case preferable density is about 0.03 to 0.3 g/cm$^3$. Arranging the blood-filtering material in a flat plate, a cylinder or a roll, provides other examples. In this case, blood is sucked in the direction parallel to the section of the flat plate, the cylinder or the roll. Arranging blood-filtering units in multistage provides a more example.

The test tube accommodates the blood-filtering unit may be a usual test tube or a vacuum blood-drawing tube. The unit may be fixed in the tube or simply thrown in the tube. Inside of the tube may be kept at atmospheric pressure or reduced pressure. To keep the inside of the tube at reduced pressure, the opening of the tube is sealed with a cap, a sealant etc.

With the first plasma- or serum-collecting device, a necessary volume of plasma or serum can be obtained by sucking the blood sample poured into the test tube from the suction port of the blood-filtering device.

FIGS. 1(*a*), (*b*) and (*c*) show examples of the blood-filtering unit 2 usable for the first embodiment of the present invention.

The blood-filtering unit 2 shown in FIG. 1(*a*) comprises a cylindrical holder 21 accommodating a cylindrical blood-filtering material 22. The blood-filtering material comprises a stack of polysulfone membrane 222 and glass fiber filter 221, which is wound around a hollow shaft having a lot of large apertures, contacting the polysulfone membrane with the hollow shaft. The lower end of the hollow shaft 23 is sealed with a circular plate 24. A suction port 25, which also acts as filtrate outlet, is provided at the top of the holder 2, while blood inlet 26 is provided at the bottom of the holder 21. Space is provided under and around the blood-filtering material 22, through which blood reaches the blood-filtering material 22. Then the blood passes through the blood-filtering material 22 to provide filtered plasma or serum, which enters into the hollow shaft 23 through apertures of the hollow shaft 23 and goes out of the blood-filtering unit 2 through the filtrate outlet 25.

The blood-filtering unit shown in FIG. 1(*b*) comprises a holder 21 accommodating a blood-filtering material 22 composed of glass fiber filter 221 and polysulfone membrane 222, which is set at the top of the blood-filtering material 22. A ring 27 is provided around the inside of the bottom of the holder 21 supporting the glass fiber filter 221 to produce some space under the glass fiber filter 221. At the same time downward projections 28 are provided at the top of the holder 21 to produce some space above the polysulfone membrane 222.

The blood-filtering unit shown in FIG. 1(c) comprises a holder 21 accommodating holding fixtures 29 in the shape of a reversed dish containing the blood-filtering material 22. Holding fixtures 29 are connected with the hollow shaft 23 in multistage. The blood-filtering material 22 is composed of the uppermost polysulfone membrane 222 and the subjacent glass fiber filter 221. The inferior margin of holding fixtures 29 are folded inward to oxter the inferior margin of the glass fiber filter 221. Downward projections 28 are provided at the top of the holding fixture 29 to keep down the polysulfone membrane 222 and produce some space above it. Several apertures 30 are made in the wall of the hollow shaft 23 at regions corresponding to the aforementioned space to communicate the hollow shaft to the space. The blood flows into the holder 21 through the blood inlet 26, and then is filtered during passing through each blood-filtering material 22 contained in each holding fixture 29. Thus filtered plasma or serum flows into the hollow shaft 23 through the aforementioned space of each holding fixture 29 and the corresponding aperture 30, and then flows out of the blood-filtering unit through the filtrate outlet 25.

Then, the second embodiment of the plasma- or serum-collecting device in accordance with present invention will be explained.

In the second embodiment, the blood-filtering unit is accommodated in the vacuum blood-drawing tube, wherein some space is provided above the blood inlet of the blood-filtering unit for storing blood to be filtered, and a partition wall is provided under the filtrate outlet of the unit to keep a backspace in vacuum. The blood-filtering unit is provided with an attachment (e.g. a communicating needle) to break the partition wall.

The structure of the vacuum blood-drawing tube itself may be same as that of commercially available, though the vacuum backspace may be constructed as a independent and detachable part. Material of the vacuum blood-drawing tube is selected from such plastics as polystyrene, polyesters, polymethacrylates, polypropylene, nylon and polycarbonates, or glass. The opening is sealed with the cap to keep the inside of the vacuum blood-drawing tube at reduced pressure of about 50 to 600 mmHg. Areas breakable by the communicating needle are provided at the center of the cap and on the bottom of the vacuum blood-drawing tube, respectively.

The space accommodating blood to be filtered may be about 0.1 to 20 ml, preferably about 1 to 10 ml.

The blood-filtering material is usually of a disc or a dish same as, or a little smaller than and similar figure to, the cross section of the holder cut in perpendicular to its axis.

In the second embodiment of the plasma- or serum-collecting device, a stack of the blood-filtering material and the microporous membrane may be closely fitted to the wall of the vacuum blood-drawing tube directly. In this case, the holder of the blood-filtering unit is unnecessary and only installation of the attachment for breaking the partition wall is necessary for the purpose of the present invention.

However, erythrocyte is apt to leak through a potential bypass between the periphery of the blood-filtering material and the wall of the vacuum blood-drawing tube or the holder if the blood-filtering material is used by itself, so usually some reinforcing means is required. For example, the periphery may be impregnated with resin, but combined use of such a supporting component as a frame is more preferable.

The basic shape of the frame is a ring that is composed of a round bar, a square bar or a plate. The cross section of them may be circular, elliptical, quadrangular, trapezium, etc. The corner of them contacting the blood-filtering material would preferably be rounded. The ring may be discontinuous provided that no leakage of erythrocyte occurs. It is also preferable to provide a determent in the inside of the ring supporting the lower surface of the microporous membrane to prevent potential deformation or dropout by suction during filtration of blood. The determent preferably may be composed in a gridiron, a radial pattern, or of a net, a board with perforations having a wide aperture as a whole, or projections.

The frame may be either contacted or not contacted with the blood-filtering material. However, the frame is preferably contacted with the blood-filtering material around the rim of the blood-filtering material.

Examples of frames contacted with the blood-filtering material will be explained first.

Figure 3:
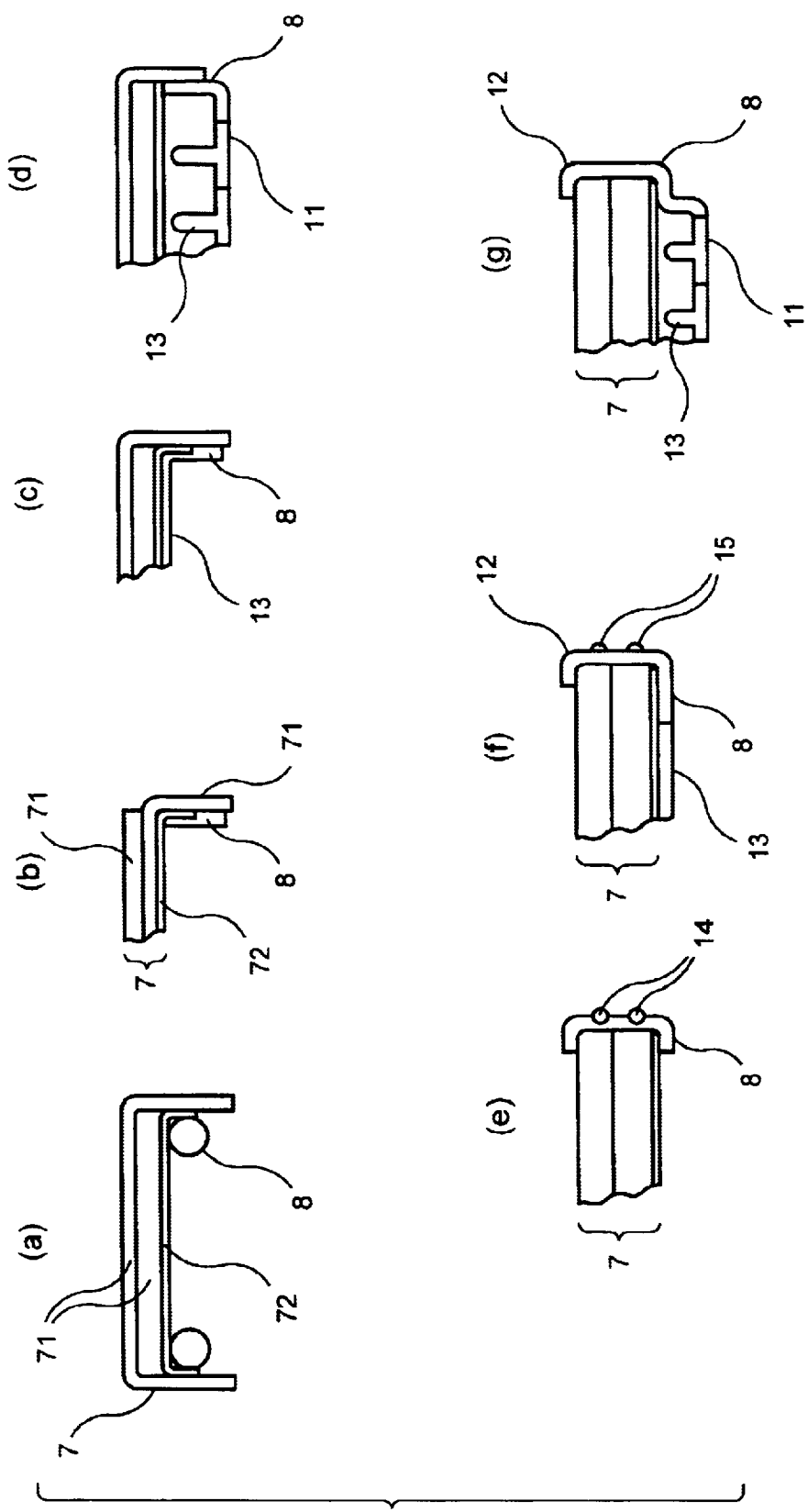
FIG. 3 shows various partial sections of the blood-filtering unit usable in this invention.

From (a) to (d) of FIG. 3 show schematically the frame contacting with the blood-filtering material. The frame 8 shown in FIG. 3(a) is composed of a ring of a round bar, which pushes the rim of the blood-filtering material 7. The blood-filtering material is composed of plural glass fiber filters 71 and a sheet of microporous membrane 72. Both of the diameters of the uppermost glass fiber filter 71 and the microporous membrane 72 are designed to be larger than the internal diameter of the holder (not shown). Thus, rims of the blood-filtering material and the microporous membrane are folded downward and stuck fast to the inner wall of the holder.

The frame 8 shown in FIG. 3(b) is composed of a ring of a flat board. Peripheries of the undermost glass fiber filter 71 of the blood-filtering material 7 and the microporous membrane 72, having larger diameters than the internal diameter of the holder, are also folded downward, while a upper glass fiber filter 71 is partially adhered to the undermost glass fiber filter.

The frame 8 shown in FIG. 3(c) is composed of a ring having cross-section of L-shape. The internal aperture of the ring is provided with the supporting component 13 of a cross-shape.

The frame 8 shown in FIG. 3(d) is composed of a dish having several holes 11 with large aperture in the bottom. The supporting component of upward projections 13 is provided on the bottom of the dish.

Then examples of frames not contacted with the blood-filtering material will be explained.

In this case, the frame comprises a segment sticking fast to the inner wall of the holder to prevent leakage of erythrocyte and another segment supporting the blood-filtering material. The frame is constructed to prevent leakage of erythrocyte through a void between the blood-filtering material and the frame. Sealing structure may be preferably provided on the surface of the frame sticking fast to the internal wall of the holder, i.e. on the external surface of the frame. One embodiment of the sealing structure may comprise at least one O-ring embedded into a dent grooved around the external surface of the frame. In other embodiment, the frame is made of an elastic material having an integrally molded protrusion around the external surface, which acts as the sealing structure by itself. The blood-filtering material is supported by oxtering, grasping, or adhering the periphery of the material. When there is the possibility of leakage of erythrocyte through a void between the frame and the blood-filtering material, the void may be filled with sealant or the blood-filtering material may be adhered to the frame with adhesive. However, the most concise procedure is to cut the blood-filtering material so as not to generate the void.

From (e) to (g) of FIG. 3 schematically show frames not contacting with the blood-filtering material.

The frame 8 shown in FIG. 3(e) is composed of a ring of a channel staff, oxtering the blood-filtering material between its flanges. O-rings 14 are embedded in two grooves engraved around the external surface of the frame.

The frame 8 shown in FIG. 3(f) is composed of a ring having cross-section of L-shape. Several claws 12 project inward from the top of the frame to hold down the blood-filtering material. Two ribs 15 are provided around the external surface of the frame, which act as sealants between the internal wall of the holder. Further, the supporting component 13 of a cross-shape is provided at the bottom of the frame 8.

The frame 8 shown in FIG. 3(g) comprises a ring having cross-section of L-shape and a dish connected to the inside of the ring. No ribs are provided around the external surface of the ring. Several holes 11 with large aperture are perforated in the bottom of the dish, while several projections 13 are formed upward from the bottom of the dish to support the blood-filtering material.

The frame is preferably made of materials that don't have any effect on blood and have rather high mechanical strength. Metals such as stainless steel or aluminum, plastics such as fluorocarbon resin, nylon, polyethylene, polystyrene or polypropylene may be preferable.

The present invention is described in more detail by referring to the following examples.

EXAMPLES

Example 1

FIG. 2 shows an example of the first plasma- or serum-collecting device in accordance with the present invention. This plasma- or serum-collecting device comprises the blood-filtering unit 2 accommodated in the test tube 1, wherein the upper side of the test tube is sealed with the sealant 3. The inside of the test tube is depressurized.

Example 2

Figure 4:
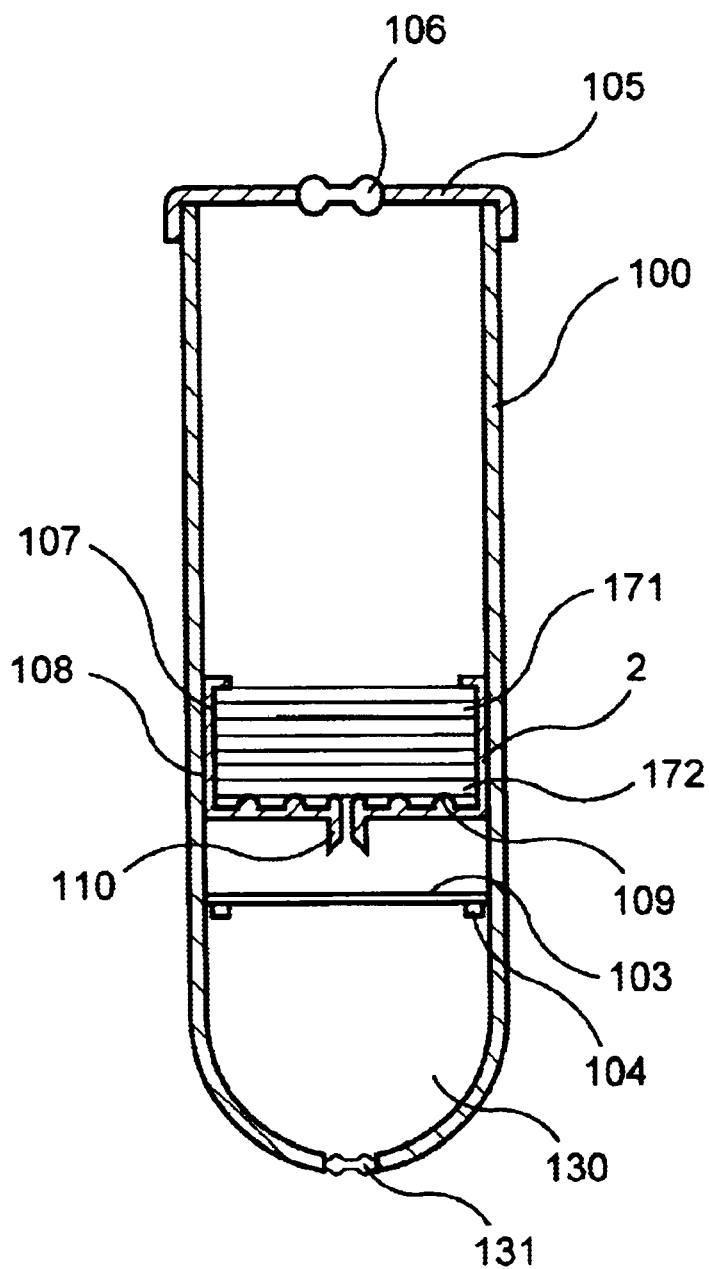
FIG. 4 exemplifies the vertical section of another plasma- or serum-collecting device in accordance with the present invention.

FIG. 4 shows an example of the second plasma- or serum-collecting device in accordance with the present invention.

This plasma- or serum-collecting device comprises the blood-filtering unit 2 accommodated in the vacuum blood-drawing tube 100. The vacuum blood-drawing tube 100 is provided with the cap 105 having the area 106 breakable by a communicating needle of a blood-drawing unit (not shown), the area 131 at the bottom breakable by another communicating needle (not shown), and the partition wall 103 supported by the frame 104. The blood-filtering unit 2 comprises the frame 107 containing the glass fiber filter 171 and the microporous polysulfone membrane 172. The frame 104 is provided with the communicating needle 110 and projections 109 to produce a space under the microporous polysulfone membrane 172. The periphery 108 of the frame 107 is closely contacted with the inside wall of the vacuum blood-drawing tube 100 to prevent the generation of a bypass. The backspace 130 is provided under the partition wall 103. Inside of the backspace 130 is also kept at a decreased pressure to suck and filter the blood collected in the space above the blood-filtering unit 2 when the communicating needle 110 breaks the partition wall 103.

What is claimed is:

1. A plasma- or serum-collecting device comprising a vacuum blood-drawing tube accommodating a blood-filtering unit, wherein the vacuum blood-drawing tube contains a space above the blood-filtering unit to preserve blood to be filtered and a partition wall under the blood-filtering unit to keep a backspace at reduced pressure; the blood-filtering unit contains a communicating needle to break the partition wall.

2. The plasma- or serum-collecting device of claim 1, wherein the blood-filtering unit comprises a stack of glass fiber filter and microporous membrane as blood-filtering material.

* * * * *